(12) United States Patent
Ryann

(10) Patent No.: US 8,682,387 B2
(45) Date of Patent: Mar. 25, 2014

(54) MOBILE DEVICE INTERFACE PLATFORM

(76) Inventor: William Frederick Ryann, San Antonio, TX (US)

( * ) Notice: Subject to any disclaimer, the term of this patent is extended or adjusted under 35 U.S.C. 154(b) by 473 days.

(21) Appl. No.: 11/582,595

(22) Filed: Oct. 18, 2006

(65) Prior Publication Data

US 2008/0096615 A1  Apr. 24, 2008

(51) Int. Cl.
*H05K 5/00* (2006.01)

(52) U.S. Cl.
USPC .................................. 455/556.1; 361/679.41

(58) Field of Classification Search
USPC ............. 455/90.3, 556.1, 334, 558, 354, 445, 455/569.1, 414.1, 411; 361/679, 679.41; 705/17; 379/445
See application file for complete search history.

(56) References Cited

U.S. PATENT DOCUMENTS

| | | | |
|---|---|---|---|
| 5,818,691 A * | 10/1998 | McMahan et al. | 361/679.43 |
| 6,266,539 B1 * | 7/2001 | Pardo | 455/556.2 |
| 6,397,081 B1 * | 5/2002 | Franck et al. | 455/558 |
| 6,642,629 B2 | 11/2003 | DeLeeuw | |
| 6,856,043 B2 | 2/2005 | DeLeeuw | |
| D552,598 S | 10/2007 | Bart | |
| 7,306,386 B2 | 12/2007 | Lyman | |
| 7,462,951 B1 | 12/2008 | Baarman | |
| 7,580,255 B2 | 8/2009 | Crooijmans | |
| 7,580,728 B2 | 8/2009 | Vance | |
| 7,719,830 B2 | 5/2010 | Howarth | |
| 7,869,195 B1 | 1/2011 | Patton | |
| 7,885,622 B2 | 2/2011 | Krampf | |
| D634,304 S | 3/2011 | Andre | |
| 7,933,117 B2 | 4/2011 | Howarth | |
| D638,831 S | 5/2011 | Paradise | |
| 2002/0086647 A1 * | 7/2002 | Ilvonen | 455/90 |
| 2002/0086703 A1 * | 7/2002 | Dimenstein et al. | 455/557 |
| 2002/0145438 A1 | 10/2002 | Ramesh | |
| 2002/0164973 A1 * | 11/2002 | Janik et al. | 455/403 |
| 2002/0172336 A1 * | 11/2002 | Postma et al. | 379/110.01 |
| 2003/0073456 A1 * | 4/2003 | Griffin et al. | 455/550 |
| 2003/0224726 A1 * | 12/2003 | Shearer et al. | 455/41.1 |
| 2004/0027002 A1 | 2/2004 | DeLeeuw | |
| 2004/0193499 A1 * | 9/2004 | Ortiz et al. | 705/17 |
| 2004/0224638 A1 | 11/2004 | Fadell et al. | |
| 2004/0251646 A1 * | 12/2004 | Erbach | 280/43.12 |
| 2005/0003813 A1 * | 1/2005 | Wonak et al. | 455/426.2 |
| 2005/0007067 A1 | 1/2005 | Baarman et al. | |
| 2005/0215233 A1 * | 9/2005 | Perera et al. | 455/411 |
| 2006/0061963 A1 * | 3/2006 | Schrum | 361/686 |
| 2006/0176524 A1 * | 8/2006 | Willrich | 358/474 |
| 2006/0250764 A1 * | 11/2006 | Howarth et al. | 361/683 |
| 2007/0038434 A1 | 2/2007 | Cvetko | |
| 2007/0060198 A1 * | 3/2007 | Kuo | 455/558 |
| 2007/0133521 A1 * | 6/2007 | McMaster | 370/352 |
| 2007/0224841 A1 | 9/2007 | Davis | |
| 2007/0230099 A1 | 10/2007 | Turner | |
| 2009/0303692 A1 | 12/2009 | Terlizzi | |

* cited by examiner

*Primary Examiner* — Nizar Sivji (57) ABSTRACT

A mobile device interface platform. The platform is configured to latitudinally receive any of a variety of mobile device sizes and shapes while being integrally associated with a stationary apparatus that is to communicate with the mobile device. Where wireless mobile devices are accommodated by the platform, the latitudinal reception affords a user a degree of imprecise placement and allows any number of wireless device types to be employed without regard to precise pin configurations or other non-wireless communicative coupling features. Nevertheless, a physically secure unitary association of the mobile device and stationary apparatus is present allowing for a functional and user-friendly manner of employing them together.

19 Claims, 7 Drawing Sheets

MOBILE DEVICE INTERFACE PLATFORM

BACKGROUND

Embodiments described relate to an interface between an electronic stationary apparatus and an electronic mobile device having data stored thereon. In particular, embodiments relate to the physical and communicative coupling of such electronic devices to one another.

BACKGROUND OF THE RELATED ART

A mobile device such as an MP3 player may be coupled to a stationary apparatus such as a computer or car stereo through a mobile device interface platform (MDIP). The MDIP may include an adapter cable running from the MP3 player that, in the case of a car stereo, plugs into its tape deck. In this manner, the MDIP allows the digital music within the MP3 player to be accessed and played by the car stereo. Use of such a cable, however, fails to provide substantial physical security between the mobile device and the stationary apparatus. That is, unlike a cassette tape in the tape player of the car stereo, the described MP3 player remains largely disassociated from the car stereo in a physical sense. Thus, the practical utility of physically associating the MP3 player with the car stereo is lacking, perhaps leaving the MP3 player optionally strewn about the car.

In order to provide a less cumbersome and more physically unitary coupling between the mobile device and the stationary apparatus, an MDIP may be employed that is integral with the stationary apparatus. For example, a stationary apparatus in the form of a car stereo or desktop computer may be provided with a built in docking station to serve as the MDIP. In the case of a desktop computer, the docking station may be integral with the main body or base of the more stationary computer. The docking station may serve as the interface platform for receiving and securing a mobile device such as a particular type of MP3 or other media player (such as an iPod manufactured by Apple Computer of Cupertino, Calif.). Where the MDIP is integral with the stationary apparatus in this manner, the physical coupling of the mobile device to the stationary apparatus securely anchors the mobile device directly at the stationary apparatus. This more physically secure and unitary association of the mobile device and stationary apparatus provides a much more functional and user-friendly manner of employing them together.

Unfortunately, the above-described integral docking stations are generally configured for a particular type or brand of mobile device, such as the above-noted iPod, to the exclusion of all others. Unlike other forms of media storage such as CD's, cassette tapes, and DVD's, there is presently a significant lack of physical uniformity in accepted versions of many digital and/or powered mobile devices. That is, a multitude of MP3 players, cell phones, and other combined media, storage, and/or communication devices presently exist with no apparent end in sight to their physical configurations or their individually unique coupling features (i.e. USB interfaces, serial ports, pin configurations, etc.). Thus, there is similarly no end in sight to the variety of integral docking stations that would need to be provided at a stationary apparatus in order to ensure that it would be able to couple with a randomly selected one of these mobile devices in a physically secure manner.

At present, stationary apparatuss either securely accommodate select mobile types to the exclusion of all others or simply fail to provide integral physical security between the mobile device and the stationary apparatus altogether. The severity of this problem is exacerbated by the fact that powered mobile devices in particular continue to grow in terms usage and functionality. To wit, access to a user's mobile device is increasingly becoming the primary means of access to that particular user's pictures, music and other personal information.

SUMMARY

A mobile device interface platform is provided having an engagement mechanism for latitudinally receiving and retaining a mobile device. The mobile device interface platform is integrally associated with a stationary apparatus to obtain data from the mobile device.

DETAILED DESCRIPTION

Embodiments of a mobile device interface platform are described with reference to certain mobile device and stationary apparatus types. For example, a stationary apparatus in the form of a car stereo and a powered mobile device storing digital audio data are referenced throughout. Regardless, embodiments disclosed provide a mobile device interface platform integral with the stationary apparatus and having an engagement mechanism capable of stably accommodating any of a variety of mobile device shapes, sizes, types, and configurations. Additionally, embodiments described may be of particular benefit where wireless communicative coupling is to be employed in that both the positioning of the mobile device relative to the mobile device interface platform may be latitudinal, and the requirement of wire running from the mobile device may be entirely eliminated.

Figure 1:
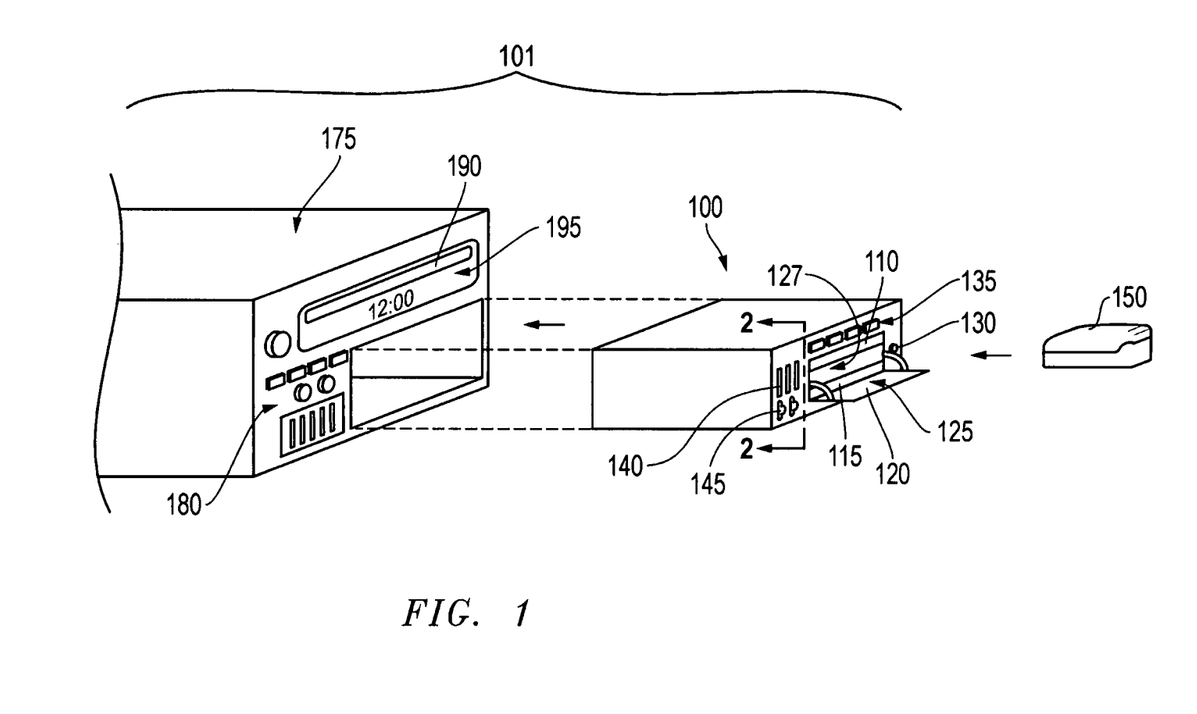
FIG. 1 is an exploded perspective view of an embodiment of a mobile device interface platform (MDIP) as part of a stationary assembly to accommodate a mobile device.

Referring now to FIG. 1, an embodiment of a mobile device interface platform (MDIP) 100 is shown as part of a stationary assembly 101. The MDIP 100 includes an engagement mechanism 125 to both latitudinally receive and physically retain a mobile device 150. The stationary assembly 101 also includes a stationary apparatus 175 for obtaining data from the mobile device 150 and for integrally coupling with the MDIP 100. In fact, in one embodiment, the MDIP 100 and the stationary apparatus 175 may be of a unitary configuration with no visible separation therebetween. Further, as described below, the MDIP 100 is provided with an engagement mechanism 125 as part of the stationary assembly 101.

In the embodiment shown in FIG. 1, the stationary assembly 101 includes a stationary apparatus 175 in the form of a car stereo. Thus, a car stereo control panel 180, clock face 195, compact disc slot 190 and other conventional car stereo features may be present. However, in alternative embodiments, the stationary apparatus 175 may be a laptop computer, desktop computer, control panel, home stereo, entertainment system, television, navigation system, or a host of other apparatus types.

Continuing with reference to FIG. 1, embodiments described herein include a stationary apparatus 175 that is of a less personally mobile character than the mobile device 150. Thus, the MDIP 100 serves as a functional and user-friendly interface therebetween. For example, in the embodiment shown, the mobile device 150 may be a cell phone with MP3 data stored therein, whereas the stationary apparatus 175 is a car stereo as noted. In such an embodiment, the car stereo is designated as the stationary apparatus 175 even though it may have some degree of mobility in as much as it is for use in an automobile and may be transported about. That said, a mobile device 150 in the form of a cell phone may naturally be considered of greater personally mobile character given its configuration for transport and use on person. Stated another way, while virtually any consumer electronic device may be characterized as having some degree of mobility, the embodiments described herein include a mobile device 150 that is of greater personal mobility for a user than the stationary apparatus 175 to which it may be coupled.

As indicated above, a mobile device 150 of greater personally mobile character is present in the form of a cell phone with MP3 data stored thereon. However, in other embodiments, the mobile device 150 may be a conventional MP3 player, flash device, pc card, handheld or personal carriage digital device, or a variety of other data storage devices. Further, such a mobile device 150 may include its own independent power source and/or be configured for powered coupling to the MDIP 100 or stationary apparatus 175 as described further herein.

As shown in FIG. 1, the MDIP 100 may be integrally coupled to the stationary apparatus 175 providing a stationary assembly 101 of unitary configuration. Thus, even in circumstances where the stationary apparatus 175 is a car stereo or other potentially semi-mobile device, the MDIP 100 remains integrally coupled to the stationary apparatus 175 during use. As a result, integral physical security is provided between the stationary apparatus 175 and any mobile device 150 that is itself retained by the MDIP 100 as described below.

In the embodiments described herein, the mobile device 150 is latitudinally received by the engagement mechanism 125 of the MDIP 100. That is, in one embodiment, the mobile device 150 may be loosely received within a cavity 127 defined by the engagement mechanism 125 such that a significant degree of play may be present between the mobile device 150 and the engagement mechanism 125. Thus, when a door 120 to the cavity 127 is open as shown in FIG. 1, the engagement mechanism 125 may receive and accommodate a variety of mobile device sizes, dimensions and shapes (i.e. 'morphologies').

As indicated above a mobile device 150 may be any of a variety of data storage devices, including powered devices such as the cell phone with MP3 data stored thereon as shown in FIGS. 1-5, and 7. In the embodiments shown, the cell phone mobile device 150 is of a clamshell configuration. However, the mobile device 150 may be a slide phone or other device that physically expands by sliding open. Also, the mobile device 150 may be of unitary construction, often referred to as a 'candybar' design, not configured for physically expanding by opening and closing. As indicated, the mobile device 150 may be a host of other devices such as MP3 players, flash storage devices, pc cards, and a variety of handheld data storage devices, some of which may even display a degree of ergonomic design for user-friendly functionality. Generally, such mobile devices 150 range from about 0.75 inches to about 3.0 inches wide by between about 2.75 inches to about 5.0 inches in length and have a profile of between about 0.25 inches and about 1.0 inch. However, larger, and in some instances even smaller, mobile devices 150 may be employed.

Embodiments of the mobile device 150 may be of significantly differing physical character from one mobile device 150 to the next. This physical character may differ from one mobile device 150 to the next in terms of mobile device size (i.e. dimensionally). Alternatively, the differing physical character may also be in terms of mobile device shape or configuration (e.g. clamshell phone versus slide phone). Nevertheless, a single engagement mechanism 125 may be employed to accommodate any of a variety of mobile devices of significantly differing physical character.

Figure 2:
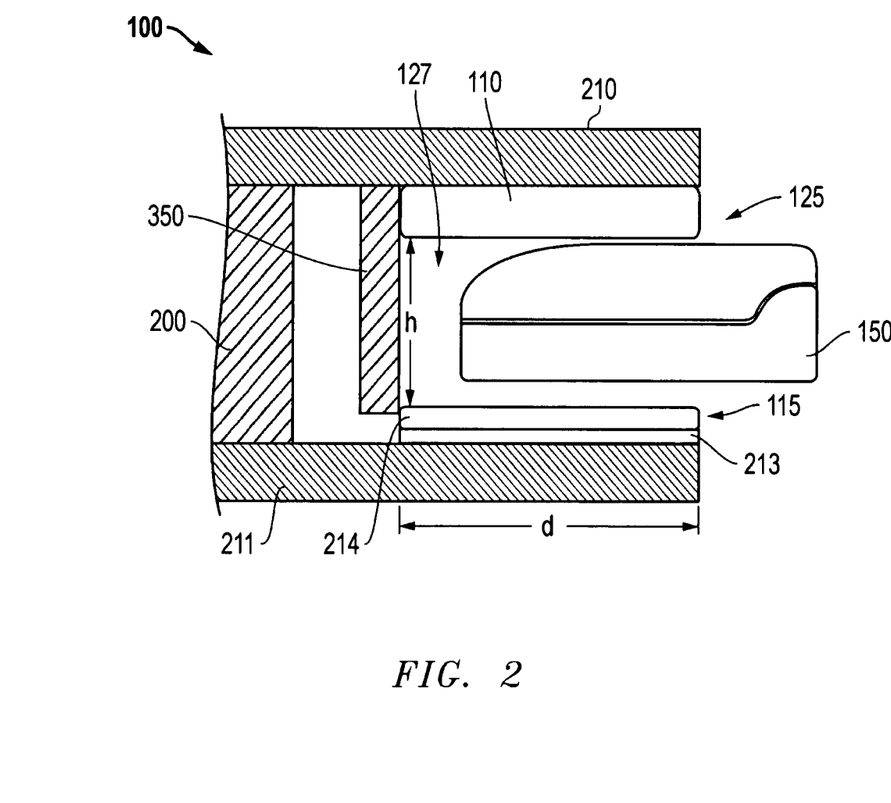
FIG. 2 is a side cross-sectional view of an embodiment of an engagement mechanism of the MDIP taken from section lines 2-2 of FIG. 1.

Continuing with reference to FIGS. 1 and 2, the engagement mechanism 125 of the MDIP 100 is configured to latitudinally receive the mobile device 150 as described above. Furthermore, it is also configured to supportably retain or secure the mobile device 150 in a stably sustained manner. As detailed further herein this may include squeezing or conformably immobilizing the mobile device 150 with members directed thereat. In the embodiments shown, this may be achieved by a clamping or compression action of a lower compression member 115 against an upper compression member 110 once the mobile device 150 is inserted into the cavity 127. Thus, in order to subsequently remove the mobile device 150, an eject button 130 is also shown in the embodiment of FIG. 1 to actuate decompression of the compression members 110, 115 relative to one another. Furthermore, in addition to the engagement mechanism 125, the MDIP 100 of FIG. 1 reveals other features such as an MDIP control panel 135 and supplemental device coupling features which may include USB ports 140 or power sockets 145 also detailed further herein.

Referring more specifically now to FIG. 2, a side cross-sectional view of an embodiment of the engagement mechanism 125 of the MDIP 100 of FIG. 1 is shown. With reference to this view, latitudinal reception of the mobile device 150 by the engagement mechanism 125 is described below. Of note is the fact that in the embodiments shown, the latitudinal reception capacity of the engagement mechanism 125 is a function of height (h) and width (w) of the cavity 127 without reference to the depth (d) thereof as described further herein.

As shown in FIG. 2, as the mobile device 150 is inserted into the cavity 127 of the engagement mechanism 125 it is apparent that the height (h) between the upper and lower compression members 110, 115, is more than enough to provide clearance for the insertion of the mobile device 150. Similarly, a width (w) across the cavity 127 may be provided that is likewise more than enough to provide clearance for the insertion of the mobile device 150 (see FIG. 5). Thus, latitudinal reception of the mobile device 150 is provided. In fact, given a deformable nature of at least one of the compression members 110, 115, even a mobile device 150 having a profile roughly equivalent to the height (h) may be latitudinally received, given the amount of play provided by such a compression member 110, 115.

Figure 5:
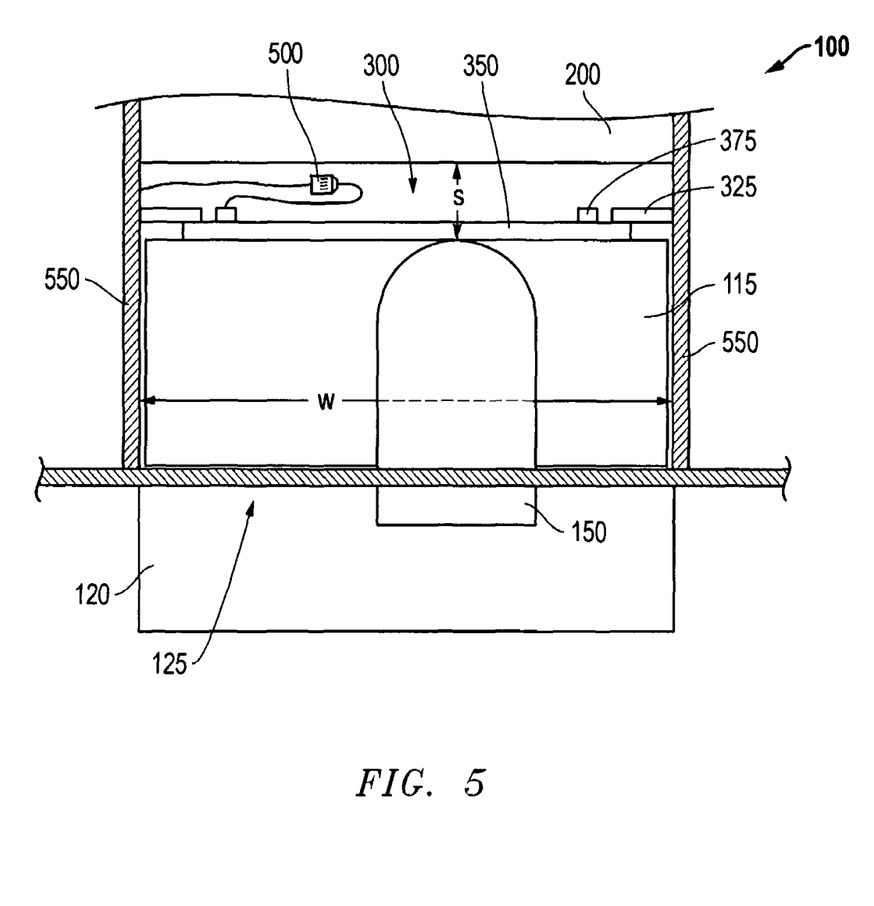
FIG. 5 is a top cross-sectional view of the engagement mechanism of FIG. 2 securing the mobile device of FIG. 1.

Continuing with reference to FIG. 2, and with added reference to FIG. 5, the latitudinal reception capacity of the engagement mechanism 125 in terms of height (h) and width (w) is further detailed. With particular reference to FIG. 2, it is apparent that the height (h) of the cavity 127 to accommodate the profile or height of the mobile device 150 is defined by the distance between the upper and lower compression members 110, 115. Thus, in order to ensure that the profile of the mobile device 150 is latitudinally received by the height (h) of the cavity 127, the height (h) is configured with a range of potential mobile device 150 profiles in mind. For example, as indicated above, embodiments of the mobile device 150 may have a profile or height of between about 0.25 inches and about 1.0 inches. Therefore, in one embodiment the height (h) of the cavity 127 is between about 0.75 inches and about 1.25 inches, preferably about 1 inch. In this manner, a wide variety, if not most, mobile device 150 types, may be latitudinally received within the cavity 127 in terms of height.

With brief added reference to FIG. 5, described in further detail below, it is apparent that the width (w) of the cavity 127 to accommodate the width of the mobile device 150 is defined by the sidewalls 550 of the engagement mechanism 125. Thus, similar to the height (h) configuration described above, the width (w) of the cavity 127 is configured with a range of likely mobile device 150 widths in mind in order to ensure that the width of the mobile device 150 is latitudinally received by the width (w) of the cavity 127. For example, as also indicated above, embodiments of the mobile device 150 may have a width of between about 0.75 inches and about 3.0 inches. Therefore, in one embodiment the width (w) of the cavity 127 is between about 1.0 inch and about 5.0 inches, preferably at least about 2.0 inches wide. In an embodiment where the width (w) is between about 2.0 inches and about 3.0 inches a wide variety, if not most, mobile device 150 types, may be latitudinally received within the cavity 127 in terms of their width.

Continuing with reference to FIGS. 2 and 5, where space permits for the stationary assembly 101, the width (w) may be greater than about 3.0 inches (see FIG. 1). That is, the overall footprint of the engagement mechanism 125 at the surface of the stationary assembly 101 may be less affected by the width of the engagement mechanism 125 (again see FIG. 1). Hence, in certain embodiments the width (w) of the cavity 127 may be oversized where desired. In fact, in the embodiment shown in FIG. 5, the mobile device 150 may be between about 2.0 inches and about 3.0 inches wide. Nevertheless, the width (w) of the cavity 127 may be between about 4.5 and about 5.5 inches wide. Thus, any one of substantially every known mobile device 150 type, including the one shown in FIG. 5, may be latitudinally received within the cavity 127 in terms of device width. Similar to a conventional CD slot, such as the compact disc slot 190 of the stationary apparatus 175, this may be achieved without significant sacrifice to surface space of the stationary assembly 101 (see FIG. 1). Further, such an oversized width (w) may provide for more of a user friendly access to the engagement mechanism 125.

Figure 7:
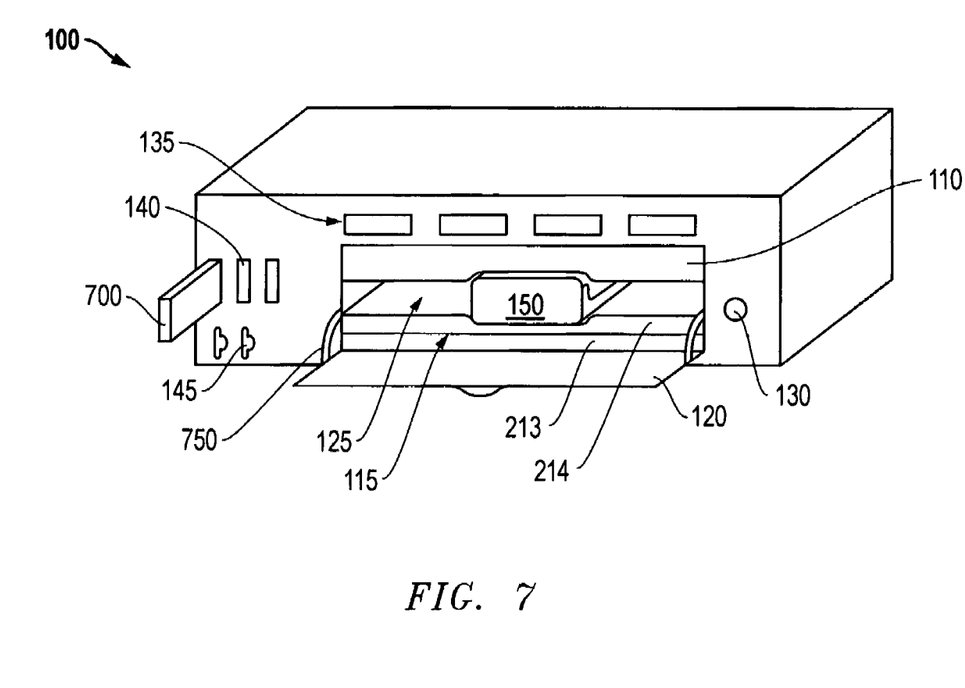
FIG. 7 is a front perspective view of the MDIP of FIG. 1 securing the mobile device of FIG. 1.

In the embodiments shown, the latitudinal reception of the mobile device 150 is achieved with the door 120 of the MDIP 100 opened (see FIGS. 1 and 7). Thus, as indicated above, the depth (d) of the cavity 127 fails to play a role in the latitudinal reception capacity of the engagement mechanism 125. However, in other embodiments where the mobile device 150 is to be fully encased or enclosed within the cavity 127, all dimensions, including depth (d), may be configured to ensure substantially complete latitudinal reception of the mobile device 150.

Continuing with reference to FIGS. 2 and 5, the above noted cavity 127 is defined in terms of its height (h) between the compression members 110, 115 prior to actuation of compression (see discussion below relative to FIGS. 3 and 4 regarding actuation of compression). The width (w) of the cavity 127 is defined by the distance between the sidewalls 550 of the engagement mechanism 125. Furthermore, although not determinative of latitudinal reception capacity in the embodiments shown, the depth (d) of the cavity 127 is noted herein as the distance from the entrance or doorway to the cavity 127 (at a door 120) to a beam 350 opposite the entrance. As described below, this beam 350 may act as a backstop for the entering mobile device 150 in addition to providing detection information relative to the position of the mobile device 150.

A component housing 200 including a wireless data receiver may be located adjacent the above described beam 350. Thus, positioning of the mobile device 150 in contact with the beam 350 may help ensure the wireless coupling of the mobile device 150 to wireless features of the component housing 200. The wireless nature of such a coupling may allow freedom from or avoidance of precise device 150 positioning as might otherwise be required by the use of a pin pattern configuration or other non-wireless communicative coupling (i.e. which may be referred to herein as "pin-free" type docking). This is described in further detail with respect to FIG. 5 below.

While the cavity 127 is referenced as defined by the above noted features, the cavity 127 is not necessarily a completely sealed off enclosure. In fact, a door 120 to the cavity 127 may be open at one end when the engagement mechanism 125 is in use. Nevertheless, the above described features defining the cavity 127 provide enough continuity to allow the latitudinal reception by the engagement mechanism 125. This latitudinal reception is achieved in secure enough of a manner so as to also allow for the physical retention of the mobile device 150 upon actuation of compression of the compression members 110, 115 as described below.

Continuing with reference to FIG. 2, the upper compression member 110 may be a compliant material secured to a stationary and firm ceiling 210 of the MDIP 100 whereas the lower compression member 115 may include a pad 214, also of a compliant material, coupled to a vertically movable rigid support 213. As described further below, the rigid support 213 may be raised above the floor 211 of the MDIP 100 securing the mobile device 150 between the upper compression member 110 and the pad 214.

Figure 3:
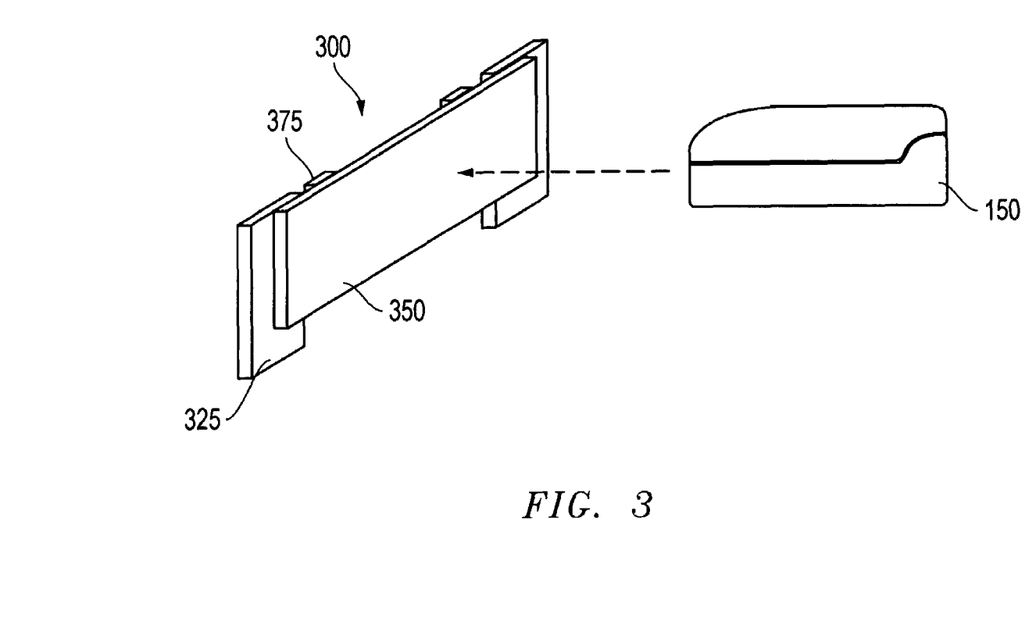
FIG. 3 is a perspective view of an embodiment of an engagement actuator of the MDIP of FIG. 1.

Continuing now with reference to FIGS. 2 and 3, the mobile device 150 may be inserted into the cavity 127 and toward an engagement actuator 300 of the engagement mechanism 125 at the back of the cavity 127. In the embodiments shown in FIGS. 2-5 the engagement actuator 300 is a conventional strain gauge mechanism whereby contact between the mobile device 150 and the engagement actuator 300 may be detected. As described with reference to FIG. 4 below, such detection may be employed to trigger movement of one of the compression members 110, 115 in order to secure the mobile device 150 in position within the cavity 127.

With reference to FIG. 3 in particular, the engagement actuator 300 is a strain gauge mechanism, with the above noted beam 350 for contacting by the mobile device 150. This beam 350 is held in place by supports 325 and includes strain gauge sensors 375 coupled thereto. The strain gauge sensors 375 may detect movement in the beam 350 as a user forces the mobile device 150 toward the beam 350 making contact therewith. Detection information may then be relayed to a microprocessor 500 wired to the strain gauge sensors 375 in order to actuate securing of the mobile device 150 by the engagement mechanism 125 (see FIG. 5). Mechanical detection of the mobile device 150 may also be achieved by other methods including by contacting an elongated button or other actuating mechanism at the rear of the cavity 127 (see FIG. 2).

While the engagement actuator 300 is shown in the form of a mechanical sensor, other forms of sensors may be employed including optical sensors and motion sensors. In fact, sensing may even take place in a manner that identifies the particular mobile device 150 to the stationary assembly 101, perhaps even before wireless coupling has taken place as indicated above. For example, the engagement actuator 300 may include a bar code scanners or an RFID reader in order to identify a mobile device 150 having appropriate bar code or RFID tag features.

Figure 4:
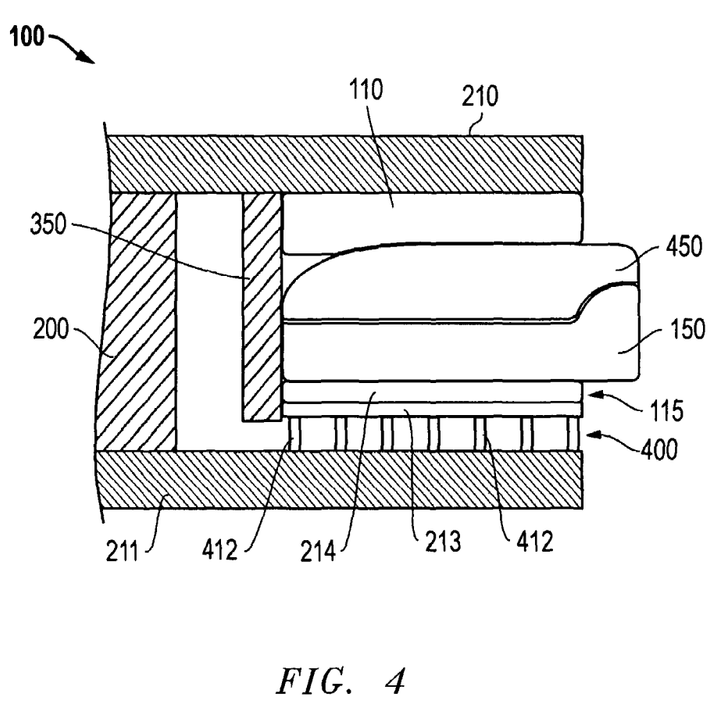
FIG. 4 is a side cross-sectional view of the engagement mechanism of FIG. 2 securing the mobile device of FIG. 1.

Continuing with reference to FIGS. 3 and 4, once the engagement actuator 300 is triggered and detection information relayed as indicated above, a lift 400 may be activated to force the lower compression member 115 upward securing the mobile device 150 against the upper compression member 110. In the embodiment shown, the lift 400 includes a plurality of projections 412 which may be spring or hydraulically activated to raise the rigid support 213 of the lower compression member 115. As indicated above, the upper compression member 110 and the pad 214 may be of compliant materials. Thus, as the lower compression member 115 forces the mobile device 150 toward the stationary firm ceiling 210 of the MDIP 100, the upper compression member 110 and the pad 214 may conform to the surface of the mobile device 150. In this manner, the mobile device 150 may be secured and retained in a cushioned fashion. Additionally, the conformal nature of the compression member 110 and the pad 214 allow the engagement mechanism 125 to secure mobile devices 150 of a wide variety of shapes and dimensions. In one embodiment the maximum deformation or compression of the compression members 110, 115 at any given conforming area thereof may be between about 5% and about 50% in conforming to the shape and/or profile of the mobile device 150.

In one embodiment the upper compression member 110 and the pad 214 may be of a polymer foam material. For example, conventional compressed foams and polyurethane foams may be employed of an open or closed cell variety. Further, in one embodiment, the pad 214 and upper compression member 110 may be of different materials. For example, in the embodiment shown, the pad 214 is of a lower profile, smaller pore size and denser structure than that of the upper compression member 110. In this manner, the pad 214 is configured for less deformation than the upper compression member 110 as the mobile device 150 is secured. Thus, an added degree of stability may be provided to the surface of the lower compression member 115 in comparison to the upper compression member 110. This may be of benefit given the moving and weight bearing nature of the lower compression member 115 as compared to the stationary and relatively stable upper compression member 110.

Continuing with reference to FIG. 4, and with added reference to FIG. 2, it may be of benefit to detect forces resulting from the presence or position of the mobile device 150 in the cavity 127. This may be true for detection of the mobile device 150 contacting the beam 350 at the back of the cavity 127 as indicated above. However, as indicated below, detection of other mechanical forces relative to the mobile device 150 as it is retained by the engagement mechanism 125 may also be of benefit.

In one embodiment, a conventional strain gauge mechanism similar to that above is coupled to the engagement mechanism 125 to measure forces exerted on the mobile device 150 as it is secured and retained. Such a mechanism may be incorporated into the stationary and firm ceiling 210 of the MDIP 100, able to detect strain forces exerted thereon via the raising lift 400. Although detected at the ceiling 210, these will be reflective of the forces exerted on the mobile device 150 itself. The detected level of strain forces may then be relayed to a microprocessor that is coupled to the lift 400.

Upon detection of a predetermined level of strain force, such a microprocessor may direct the lift 400 to cease raising and remain stationary, effecting secure retention of the mobile device 150 in the cavity 127 without damage to the mobile device. In one embodiment, the predetermined level of strain force to cause the lift 400 to cease raising is set at between about 0.25 lbs. and about 3.0 lbs. In this manner a significant percentage of all mobile devices 150 may be securely retained without damage thereto.

Notice that the degree of ascension exhibited by the lift 400 in effecting the predetermined level of strain is a function of the profile of the mobile device 150 along with the nature and amount of compressible character in both the pad 214 and the upper compression member 110. Furthermore, since the degree of ascension exhibited by the lift 400 is determined by measurements of force as opposed to lift 400 positioning, the profile of the mobile device 150 is of minimal significance so long as it is about the height (h) of the cavity 127 or less. That is, in the embodiment shown, any of a variety of mobile devices 150 having a profile of up to about 1.0 inches (i.e. the height (h)) may be securely retained by the engagement mechanism 125 as indicated.

As indicated above, and again with added reference to FIG. 2, the depth (d), from the cavity 127 entrance to the beam 350, may not play a role in determining latitudinal reception of the mobile device 150 in embodiments shown herein. Nevertheless, the depth (d) of the cavity 127 may be configured in light of the variety of lengths of mobile devices 150 likely to be accommodated. For example, as noted above, a mobile device 150 to be accommodated by an embodiment of the MDIP 100 may be between about 2.75 inches about 5.0 inches in length. In such an embodiment the mobile device 150 may be fully positioned in the cavity 127 (i.e. contacting the beam 350) while leaving an accessible portion 450 exposed for manual retrieval of the mobile device 150 from the cavity 127 following use. In such an embodiment, the engagement mechanism 125 may be configured with a depth (d) from about 1.5 inches up to about 2.75 inches, perhaps more preferably between about 2.25 inches and about 2.5 inches. In this manner, the majority of the body of such mobile devices 150 will be within the cavity 127 when positioned as indicated. Further, an accessible portion 450 of even the smallest of such mobile devices 150 will remain exposed for manual retrieval of the device 150 when positioned as indicated.

Figure 6:
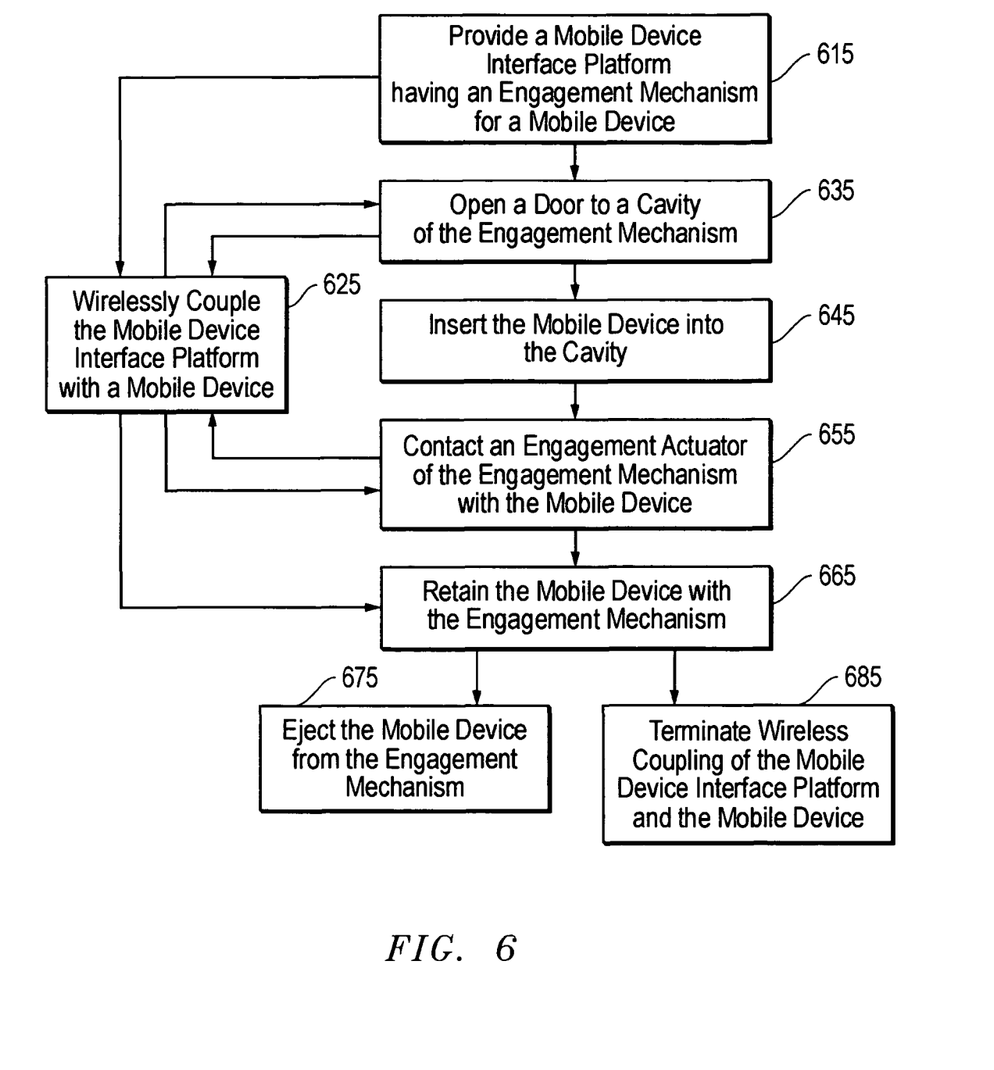
FIG. 6 is a flow chart summarizing an embodiment of coupling a mobile device to a mobile device interface platform.

Referring now to FIGS. 5 and 6, a top cross-sectional view of an MDIP 100 with engagement mechanism 125 is shown along with a flow chart summarizing an embodiment of coupling a mobile device 150 thereto. That is, an MDIP 100 with engagement mechanism 125 may be provided as indicated at 615 for receiving and retaining a mobile device 150 as described below.

In the embodiment shown, a door 125 of the MDIP 100 may be opened exposing a cavity 127 of the engagement mechanism 125 as indicated at 635. As noted at 645 and 655, and with added reference to FIG. 2, a mobile device 250 may be inserted into the cavity 127 until contact is made with an engagement actuator 300 at the rear of the cavity 127. As noted in the description above, a wide variety of mobile device sizes and shapes may be latitudinally received by the cavity 127 in this manner. Furthermore, the wireless nature of the embodiment shown allows for latitudinal positioning of the mobile device 150 within the cavity 127 without requiring the precise positioning that might otherwise be required where non-wireless communicative coupling, such as USB, pin configurations, or serial ports, are employed.

Contact with the engagement actuator 300 as indicated above, may be detected. In one embodiment, this detection may further include the identification of the mobile device 150 such as where a bar code reader, RFID mechanism are employed as indicated above. Alternatively, as indicated below, wireless coupling may take place at this time as indicated at 625 in order to provide identification.

The above described contact with the engagement actuator 300 may also lead to the secure retention of the mobile device 150 within the cavity 127 by the engagement mechanism 125 (see 665). Thus, a wide variety of mobile device 150 sizes and shapes may ultimately be coupled to a stationary apparatus 175 via the MDIP 100 where the MDIP 100 is incorporated into a stationary assembly 101 including the stationary apparatus 175 (see FIG. 1).

With added reference to FIG. 1, at some point during the described physical coupling of the mobile device 150 to the MDIP 100 and stationary apparatus 175, wireless coupling may also be attained. For example, in the embodiment shown, a mobile device 150 in the form of a cell phone with MP3 data stored thereon may be wirelessly coupled to a car stereo stationary apparatus 175 via the MDIP 100. As indicated at 625, wireless coupling, often referred to as pairing, may be achieved by conventional means at various points in time throughout the above described physical coupling of the mobile device 150 as described below.

In one embodiment wireless coupling takes place once the engagement mechanism 125 has retained the mobile device 150 as indicated at 665. Alternatively, wireless coupling may be initiated at a prior point in time, such as when the mobile device 150 is detected by the engagement actuator 300 as noted above and indicated at 655 or upon the user opening the door 120 of the MDIP 100 as indicated at 635. In fact, wireless coupling may even take place by conventional means prior to any physical coupling of the mobile device 150 as described herein (see 615). Regardless, in the embodiment shown in FIG. 5, once the mobile device 150 is positioned adjacent the beam 350 of the engagement actuator 300, a predetermined separation (s) is all that separates the wireless mobile device 150 from a component housing 200 of the MDIP 100. In one embodiment, the component housing 200 includes a wireless receiver for coupling to the mobile device 150. Thus, the features of the component housing 200 such as the wireless data receiver may be configured in light of the separation (s) to ensure wireless reception/data extraction thereacross. In fact, in one embodiment, such a wireless receiver may be directionally or otherwise conventionally tuned to the vicinity opposite the beam 350 to help ensure substantially isolated communication with the mobile device 150.

Continuing with reference to FIGS. 5-7, a user may eject the mobile device 150 from the engagement mechanism 125 as indicated at 675 by pressing a conventional eject button 130. In this manner, decompression or lowering of the lower compression member 115 may be activated through the eject button 130 by conventional means. Thus, the user may grab the accessible portion 450 of the mobile device 150 and withdraw it from the engagement mechanism 125 of the MDIP 100 (see FIG. 4). Pressing of the eject button 130 may also be employed to terminate wireless coupling of the mobile device 150 and the MDIP 100 as indicated at 685. However, in other embodiments, wireless coupling may be maintained even with removal of the mobile device 150.

Referring now to FIG. 7 a front perspective view of an embodiment of the MDIP 100 is shown. In this embodiment, the MDIP 100 and engagement mechanism 125 thereof are shown accommodating a mobile device 150. The door 120 in front of the engagement mechanism 125 is opened with stop hinges 750 holding it in position parallel with the inserted mobile device 150. At the face of the MDIP 100 other features such as a control panel 135, the eject button 130, USB ports 140, and power sockets 145 are apparent.

In one embodiment, the mobile device 150 may be configured for physical coupling through the engagement mechanism 125 as described above, with additional coupling through alternate routes. For example, the mobile device 150 may lack an independent power source or be configured to draw power from an external source when available. In such an embodiment, the mobile device 150 may be wired to a power socket 145 to provide power thereto and perhaps even recharging capability. Similarly, the mobile device 150 may lack wireless capacity or be configured to allow secure wired communication where available. In such an embodiment, the mobile device 150 may be wired to a USB port 140 or other communication port of the stationary assembly 101 (see FIG. 1). In one embodiment, the power socket 145 itself may double as a communication port, perhaps even allowing simultaneous communication and powered coupling therethrough. Furthermore, the MDIP 100 may be configured to couple to other data storage devices, such as a flash device 700, in addition to the mobile device 150. This may be of particular benefit in an embodiment where the MDIP 100 is integral with a stationary apparatus 175 in the form of a car stereo to accommodate multiple sources of MP3 or other digital audio data storage devices (see FIG. 1). These devices may include a mobile device 150 in the form of a cell phone having MP3 data stored thereon as well as MP3 flash devices 700 as shown in FIG. 7.

Embodiments described above provide an interface between mobile and stationary apparatuss configured to accommodate a host of mobile device shapes and sizes. In spite of the lack of uniformity in accepted versions of mobile devices, especially mobile devices storing digital data, the embodiments of mobile device interface platforms described herein are not limited to accommodating a particular type or brand of mobile device to the exclusion of all others. Such liberal accommodation of wide ranging mobile device types may be achieved by providing an engagement mechanism to the mobile device interface platform that includes the capacity to latitudinally receive a mobile device of a variety of shapes and sizes while also including the capacity to securely retain the mobile device in a user friendly manner.

Although exemplary embodiments describe a mobile device interface platform accommodating any of a variety of mobile devices in particular fashions, additional embodiments are possible. For example, a mobile device may be latitudinally received without leaving an accessible portion thereof exposed. In such an embodiment, a door to the cavity receiving the mobile device may be closed in order to secure the mobile device therein. Thus, a lift or other securing features described above may be avoided. Nevertheless, the door and other features defining the cavity may be lined with a compressible foam or other material to provide a degree of added security and/or cushion to the mobile device. Furthermore, many changes, modifications, and substitutions may be made without departing from the scope of the described embodiments. For a period following publication of this application and/or patent, a copy hereof may be made available at www.Licentia-IP.com.

I claim:

1. A mobile device interface platform comprising an engagement mechanism, the mechanism comprising a cavity configured for receiving and immobilizing one of a variety of differently sized mobile devices between compression members defining the cavity and in a pin-free positionally imprecise manner, the mobile device suitable for at least partial placement into a depth of the cavity, the mechanism to support a wireless coupling of the mobile device for data extraction therefrom.

2. The mobile device interface platform of claim 1 wherein the immobilized mobile device of the variety substantially differs from another mobile device of the variety in terms of one of morphology and device configuration.

3. The mobile device interface platform of claim 1 wherein said compression members are spaced apart so as to provide a height of up to about 1.25 inches to the cavity.

4. The mobile device interface platform of claim 1 wherein the engagement mechanism further comprises:
   a backstop; and
   a doorway, the backstop distanced from the doorway so as to define the depth to the cavity.

5. The mobile device interface platform of claim 4 wherein the depth is configured to leave an accessible portion of the mobile device exposed beyond said doorway when contacting said backstop, the accessible portion to allow manual retrieval of the mobile device.

6. The mobile device interface platform of claim 4 wherein said backstop is at least a portion of an engagement actuator to actuate the immobilizing.

7. The mobile device interface platform of claim 4 wherein said backstop is a beam of a strain gauge mechanism.

8. The mobile device interface platform of claim 4 further comprising a component housing adjacent said backstop opposite the cavity.

9. The mobile device interface platform of claim 8 wherein said component housing includes a wireless receiver tuned to a location of the cavity.

10. A system comprising:
    one of a variety of differently sized mobile devices for storing data;
    a stationary apparatus for wirelessly obtaining data from said mobile device when docking thereto; and
    a mobile device interface platform of said stationary apparatus comprising a cavity of a depth suitable for at least partial placement of said mobile device thereinto between compression members defining the cavity, said mobile device interface platform configured to receive and immobilize said mobile device for the docking and in a pin-free positionally imprecise manner to support the wirelessly obtaining of the data by said stationary apparatus from said mobile device.

11. The system of claim 10 wherein the stationary apparatus is one of a car stereo, laptop computer, desktop computer, control panel, home stereo, entertainment system, television, and navigation system.

12. The system of claim 10 wherein one of said stationary apparatus and said mobile device interface platform includes a supplemental device coupling feature.

13. The system of claim 12 wherein the supplemental device coupling feature is one of a USB port and a power socket.

14. A handheld mobile device selected from a variety of differently sized handheld mobile devices and constructed for coupling to a stationary apparatus via a mobile device interface platform integral with the stationary apparatus, the mobile device interface platform comprising a cavity of a depth suitable for at least partial placement of the handheld mobile device thereinto, the mobile device interface platform to receive and immobilize the device between compression members defining the cavity and in a pin-free positionally imprecise manner, the stationary apparatus to obtain data from the device via wireless extraction.

15. The handheld mobile device of claim 14 having a configuration that is one of clamshell, sliding, and unitary construction.

16. The handheld mobile device of claim 14 having a profile that is between about 0.25 inches and about 1.0 inches.

17. A method comprising:
    at least partially receiving one of a variety of differently sized mobile devices within a depth of a cavity of a mobile device interface platform integrally coupled with a stationary apparatus;
    immobilizing the mobile device within the cavity between compression members defining the cavity, said immobilizing to achieve docking of the mobile device in a pin-free positionally imprecise manner; and
    wirelessly extracting data from the immobilized device for use by the stationary apparatus.

18. The method of claim 17 further comprising effecting an engagement actuator of the mobile device interface platform with the mobile device to initiate said immobilizing.

19. The handheld mobile device of claim 14 having any of a variety of device morphologies and being one of a cell phone, MP3 player, flash device, pc card, handheld digital device, and personal carriage digital device.

* * * * *